(12) United States Patent
Dohman et al.

(10) Patent No.: US 7,329,116 B2
(45) Date of Patent: Feb. 12, 2008

(54) DOUBLE-WEBBED MANDREL

(75) Inventors: Heinrich Dohman, Hoexter (DE);
Stefan Wickenkamp, Bad Oeynhausen (DE)

(73) Assignee: American Maplan Corporation, McPherson, KS (US)

( * ) Notice: Subject to any disclaimer, the term of this patent is extended or adjusted under 35 U.S.C. 154(b) by 849 days.

(21) Appl. No.: 10/679,200

(22) Filed: Oct. 3, 2003

(65) Prior Publication Data
US 2004/0119195 A1    Jun. 24, 2004

Related U.S. Application Data

(63) Continuation of application No. 10/364,308, filed on Feb. 10, 2003, now abandoned.

(51) Int. Cl.
*B28B 3/20* (2006.01)
(52) U.S. Cl. .............. 425/464; 425/114; 425/198; 264/466
(58) Field of Classification Search ........... 425/114, 425/380, 197–199, 464–465; 264/466
See application file for complete search history.

(56) References Cited

U.S. PATENT DOCUMENTS

| | | | | |
|---|---|---|---|---|
| 1,809,837 A | * | 6/1931 | Ewart | 425/380 |
| 3,669,591 A | * | 6/1972 | Fermi et al. | 425/131.5 |
| 3,709,645 A | * | 1/1973 | Mraz | 425/192 R |
| 3,899,276 A | * | 8/1975 | Sokolow | 425/380 |
| 4,063,865 A | * | 12/1977 | Becker | 425/467 |
| 4,268,239 A | * | 5/1981 | Herrington, Jr. | 425/467 |
| 4,509,907 A | * | 4/1985 | Ratheiser | 425/197 |
| 6,645,410 B2 | * | 11/2003 | Thompson | 264/171.13 |
| 7,037,098 B2 | * | 5/2006 | Kossner et al. | 425/133.1 |
| 7,077,639 B2 | * | 7/2006 | Dohmann et al. | 425/197 |

FOREIGN PATENT DOCUMENTS

DE    29813412 U1    7/1998

OTHER PUBLICATIONS

W. Michaeli; Extrusionswerkzeuge für Kunststoffe und Kautschuk S. 156/157, Feb. 1991.

* cited by examiner

*Primary Examiner*—Yogendra N. Gupta
*Assistant Examiner*—Dimple N. Bodawala
(74) *Attorney, Agent, or Firm*—Hamilton, Brook, Smith & Brooks, P.C.

(57) ABSTRACT

An mandrel for extrusion of hollow bodies, such as, polyvinyl chloride (PVC) hard, compact, and foamed pipes, includes an inner collar, an outer collar, and a middle collar, each of the collars being radially joined by webs to the particular adjoining collar. Each interior web and exterior web, relative to the middle collar, can form a web pair, the webs of the web pair being arranged to overlap at least partially in the radial direction in a particular embodiment.

12 Claims, 2 Drawing Sheets

DOUBLE-WEBBED MANDREL

RELATED APPLICATION

This application is a continuation of U.S. application Ser. No. 10/364,308, filed on Feb. 10, 2003, which is now Abandonment, which claims priority under 35 USC 119 to German Application No. DE 102 05 843.1, filed Feb. 13, 2002, the entire teaching of which are incorporated herein by reference.

BACKGROUND OF THE INVENTION

Prior art extrusion methods have used double-webbed mandrel dies for extrusion of hollow bodies, such as polyvinyl chloride (PVC) hard, compact, and foamed pipes. The double-webbed mandrel die has an inner collar, an outer collar, and a series of webs, which radially join the inner collar and the outer collar.

Double-webbed mandrel dies for production of pipe are known, for example, from a brochure of Battenfeld Extrusionstechnik GmbH entitled "Pipe Extrusion Systems" dated October 2000. Double-webbed mandrel dies are also known in U.S. Pat. No. 4,509,907, issued to Ratheiser on Apr. 9, 1985, the entire teachings of which are incorporated herein by reference.

Prior art dies shape the outer and the inner contour of the pipe using a sleeve and a mandrel. The sleeve and the mandrel are joined together to withstand the wall friction forces and the resulting pressure forces of the extrudate (melt). The mandrel is joined to the sleeve by a series of webs. However, the pressure buildup in the melt is so great that adequate pipe quality is only achieved with sufficient subsequent compression and a limiting of the web height.

In known double-webbed pipe mandrel dies, the connection between the sleeve and the mandrel is provided by two sets of webs, which are staggered in a circumferential direction and joined by a middle collar. This technique offers two advantages. First, the pressure buildup in the melt is not as severe because less compression work is needed and a larger annular gap between sleeve and mandrel can be created. Furthermore, this allows for excellent control of wall thickness of the pipe when using a high production rate, there are no continuous web markings, and the mechanical properties of the pipe are increased when using this type of double-webbed mandrel.

SUMMARY OF THE INVENTION

To control and regulate the extrusion process, supply lines are lead through the double-webbed mandrel head. The supply lines may be power lines, or control lines used in conjunction with temperature probes, heating elements or the like devices used for interior control of the extrusion process. One drawback in the prior art techniques is that the supply lines need to be heavily folded because the webs are staggered between the individual collars. Thus, it is necessary to span the offset between the two webs within the middle collar by the supply line. In the known systems, a groove is provided in the middle collar to lead the supply lines through the mandrel head. Once the supply lines are in place, the groove is closed to protect the supply lines. The manufacturing and assembly expense required for this known technique is considerable, and is apportioned of the entire manufacturing expense for the die. Furthermore, the operating safety of the die is considerably reduced because of the above expenditures (malfunctioning of the improperly laid supply lines).

In accordance with the invention, a method and apparatus are provided which can eliminate the groove in the middle collar, such that the supply lines do not have to be folded. A double-webbed mandrel die includes an inner collar, an outer collar, and a middle collar. An interior web radially joins the inner collar to the middle collar and an exterior web radially joins the outer collar to the middle collar. An interior web and an exterior web, relative to the middle collar, form a web pair. In a particular embodiment, the webs of the web pair are arranged so they at least partially overlap in as viewed in a radial direction.

As a further enhancement, the webs of the web pair are twisted about a common axis, for example, diametrically opposite. With this arrangement, it becomes possible to lead a radial borehole from the outer collar through the web pair and the middle collar into the inner collar. The measuring and/or supply lines, especially energy lines such as power lines, can be led from the outside of the outer collar through the web pair into the inside of the inner collar, without accounting for the offset of the webs. The supply lines do not have to be folded or protected by a seal, since the groove in the middle collar can be eliminated in favor of a bore.

The webs of the web pair can be arranged so that they have an essentially common onflow axis (i.e., borehole axis), but various end axes so at least no continuous web markings are created. Thus, the melt flow arrives in a radial line at both webs, but converges at a meeting point that is radially offset from the common onflow axis.

The common axis (axis of rotation) of turning of the webs is situated close to the onflow axis and thereby produces a relatively large displacement of the outflow axes in the circumferential direction of the die. Another feature of the web geometry is it is streamlined for a particular torsion. That is, the cross-sectional geometry varies along an axis of rotation in keeping with technical flow requirements to achieve increased mechanical properties of the pipe.

The die geometry can allow for continuous shifting of the outflow axes in the circumferential direction, which produces a blurring of the web markings in the extruded pipe and provides for increased material properties of the pipe. The supply borehole can be made concentrically to the axis of rotation by choosing the die geometry. This reduces the fabrication and assembly cost and the consequent operating security has been distinctly enhanced. The middle collar can now be eliminated in the double-webbed mandrel die.

Another feature of the web arrangement is the torsion about the axis of rotation or the offset from the radial axis, the positioning of the axis of rotation, and the streamlined conditions in each segment of the web. In particular embodiments, the trend of the angle of rotation is varied along the axis of rotation, that is the offset between the outer web and the inner web can be a variable angle.

More advantageously, the cross-section of one web is streamlined, for example, teardrop-shaped, thereby advantageously influencing the conditions of flow around the web.

BRIEF DESCRIPTION OF THE DRAWINGS

The foregoing and other objects, features and advantages of the invention will be apparent from the following more particular description of embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
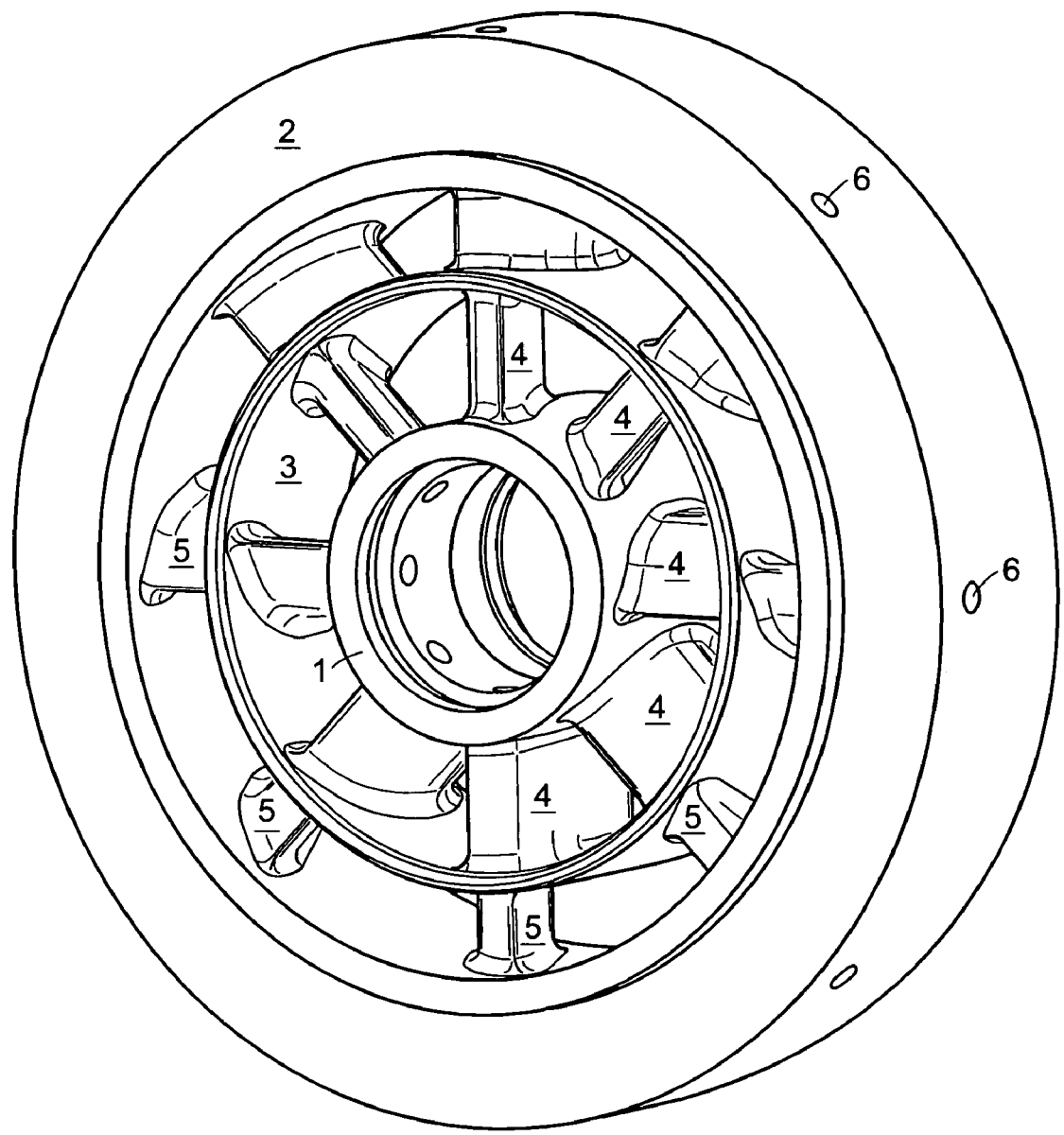
FIG. 1 is a perspective view of the invention.

As shown in FIG. 1, a double-web mandrel has an inner collar 1, a middle collar 3, and an outer collar 2 which are joined by webs 4,5. The interior webs 4 join the inner collar 1 to the middle collar 3 and the exterior webs 5 join the middle collar 3 to the outer collar 2. A borehole 6 extends from the outside of the outer collar 2 through one of the exterior webs 5, the middle collar 3, a neighboring interior web 4, and into the inner collar 1 so supply lines can be led into the device from the outside. The supply lines may be power lines, or control lines used in conjunction with temperature probes, heating elements or the like devices used for interior control of the extrusion process.

Figure 2:
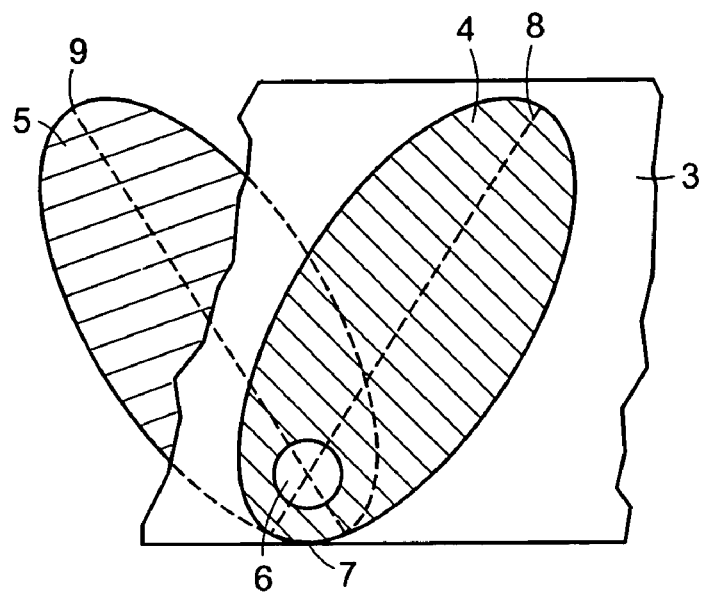
FIG. 2 is a section view of a web pair.

As shown in FIG. 2, the two neighboring webs 4, 5 are set off from each other so the convergence of the flowing plastic melt is not too far apart. The borehole 6, thus runs radially through both webs 4, 5, even though they are not arranged flush one on top of the other.

Figure 3:
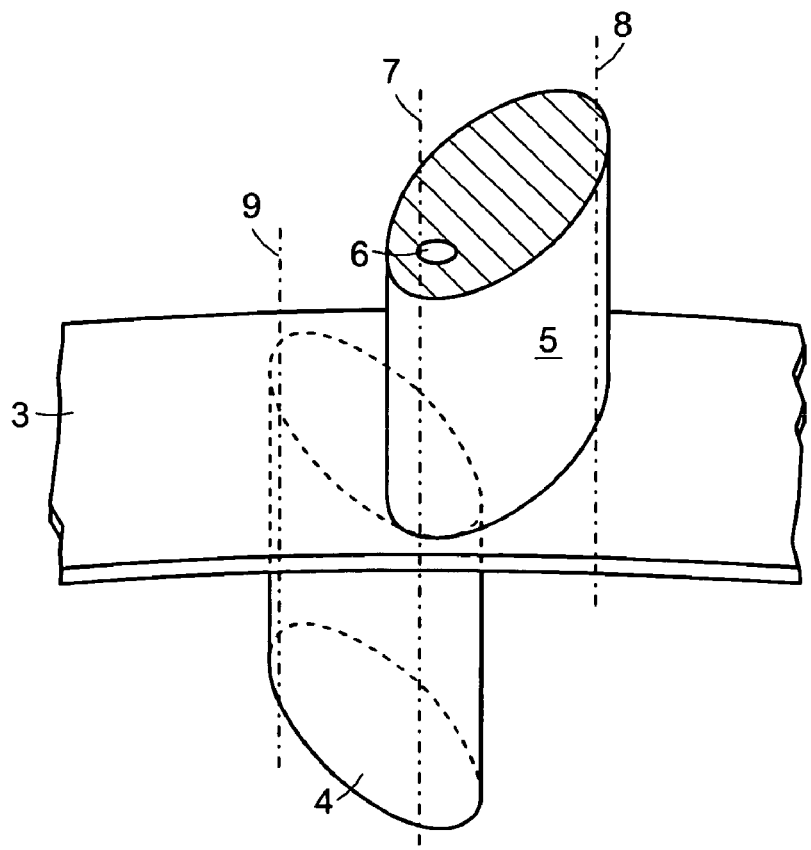
FIG. 3 is a perspective view of the web pair of FIG. 2.

As shown in FIG. 3, the two neighboring webs form a web pair 4, 5 and have a common onflow axis 7, i.e., the plastic melt flows onto both webs 4 and 5 in an identical line, looking radially. The point of confluence of the plastic melt after moving through the arrangement is different for the interior web 4 than the point of confluence of the exterior web 5 because end axes 8 and 9 are different due to the offset arrangement of the webs. This arrangement ensures no visible joint lines are formed. FIG. 3 shows a perspective of one embodiment of the offset arrangement of the webs 4 and 5.

While this invention has been particularly shown and described with references to various embodiments thereof, it will be understood by those skilled in the art that various changes in form and details may be made therein without departing from the scope of the invention encompassed by the appended claims.

What is claimed is:

1. An apparatus for extrusion of hollow bodies comprising:
   an inner collar;
   an outer collar;
   a middle collar;
   an interior web which radially joins the inner collar to the middle collar; and
   an exterior web which radially joins the outer collar to the middle collar;
   each interior web and exterior web, relative to the middle collar, forming a web pair, the webs of the web pair being arranged so they at least partially overlap as viewed in a radial direction.

2. The apparatus of claim 1, wherein the webs of the web pair are turned about a common axis.

3. The apparatus of claim 1, wherein the web pair is diametrically opposite in relation to the common axis.

4. The apparatus of claim 1, further comprising a radial borehole that extends from the outer collar through the web pair and the middle collar to the inner collar.

5. The apparatus of claim 4, wherein the radial borehole is suitable to accommodate measurement and/or supply lines.

6. The apparatus of claim 5, wherein the supply lines include power lines.

7. The apparatus of claim 1, wherein the webs of the web pair are arranged in an offset manner having a common onflow axis and different end axes.

8. The apparatus of claim 1, wherein the webs of the webbed pair are streamlined in cross-section.

9. The apparatus of claim 8, wherein the cross-section of the web is teardrop-shaped.

10. The apparatus of claim 1, wherein the apparatus is configured to form hollow bodies that include PVC-hard, compact, and foamed pipes.

11. A device for extruding hollow bodies comprising:
    an inner collar;
    an outer collar;
    a middle collar;
    an interior web which radially joins the inner collar to the middle collar; and
    an exterior web which radially joins the outer collar to the middle collar;
    the collars being arranged such that a linear borehole extends from the outside collar, through the middle collar, and into the inner collar, and through the exterior and interior webs, the exterior and interior webs being offset relative to each other about a common axis.

12. An apparatus for extrusion of hollow bodies comprising:
    means for directing a melt around an interior web and an exterior web; and
    means for providing a linear borehole from the exterior web to the interior web, the exterior and interior webs being offset relative to each other about a common axis.

* * * * *

UNITED STATES PATENT AND TRADEMARK OFFICE
CERTIFICATE OF CORRECTION

PATENT NO. : 7,329,116 B2 Page 1 of 1
APPLICATION NO. : 10/679200
DATED : February 12, 2008
INVENTOR(S) : Heinrich Dohmann and Stefan Wickenkamp It is certified that error appears in the above-identified patent and that said Letters Patent is hereby corrected as shown below:

On the title page:

Item 12, delete "Dohman", and insert --Dohmann--.

Item 75, Inventors, delete "Dohman", and insert --Dohmann--.

Signed and Sealed this

Tenth Day of June, 2008

JON W. DUDAS
*Director of the United States Patent and Trademark Office*